US012674275B2

(12) United States Patent
Weihrather et al.

(10) Patent No.: US 12,674,275 B2
(45) Date of Patent: Jul. 7, 2026

(54) TEXTILE FABRICS WITH REDUCED BUILDUP OF ODOR

(75) Inventors: Alfred Weihrather, Schwabmunchen (DE); Gunter Presnitz, Schwabmunchen (DE); Reinhold Braun, Schwabmunchen (DE)

(73) Assignee: Archroma International (Germany) GmbH, Langweid am Lech (DE)

( * ) Notice: Subject to any disclaimer, the term of this patent is extended or adjusted under 35 U.S.C. 154(b) by 545 days.

(21) Appl. No.: 13/985,142

(22) PCT Filed: Feb. 29, 2012

(86) PCT No.: PCT/EP2012/053394
§ 371 (c)(1),
(2), (4) Date: Aug. 13, 2013

(87) PCT Pub. No.: WO2012/119893
PCT Pub. Date: Sep. 13, 2012

(65) Prior Publication Data
US 2013/0333121 A1 Dec. 19, 2013

(30) Foreign Application Priority Data
Mar. 5, 2011 (EP) .................................... 11001851

(51) Int. Cl.

| | |
|---|---|
| ***D06M 13/332*** | (2006.01) |
| ***C08G 18/64*** | (2006.01) |
| ***C08G 18/80*** | (2006.01) |
| ***C08G 59/18*** | (2006.01) |
| ***C08L 63/00*** | (2006.01) |
| ***C08L 75/12*** | (2006.01) |
| ***D06M 13/325*** | (2006.01) |
| ***D06M 15/55*** | (2006.01) |
| ***D06M 15/564*** | (2006.01) |
| ***D06M 15/61*** | (2006.01) |
| ***D06M 15/643*** | (2006.01) |
| ***D06M 15/653*** | (2006.01) |
| ***D06M 101/32*** | (2006.01) |

(52) U.S. Cl.
CPC ......... *D06M 13/332* (2013.01); *C08G 18/643* (2013.01); *C08G 18/8041* (2013.01); *C08G 18/8077* (2013.01); *C08G 59/184* (2013.01); *C08L 63/00* (2013.01); *C08L 75/12* (2013.01); *D06M 13/325* (2013.01); *D06M 15/55* (2013.01); *D06M 15/564* (2013.01); *D06M 15/61* (2013.01); *D06M 15/6436* (2013.01); *D06M 15/653* (2013.01); *D06M 2101/32* (2013.01); *Y10T 442/20* (2015.04); *Y10T 442/2861* (2015.04)

(58) Field of Classification Search
CPC ......... B32B 15/08; B32B 17/10; B32B 18/00; B32B 21/08; B32B 27/04; B32B 27/28; D06M 13/332; D06M 15/6436; D06M 15/653; D06M 15/564; D06M 13/325; D06M 15/55; D06M 15/61; D06M 2101/32; C08L 63/00; C08L 75/12; C08G 18/643; C08G 18/8041; C08G 18/8077; C08G 59/184; Y10T 442/20
USPC ........................................................ 8/115.51
See application file for complete search history.

(56) References Cited

U.S. PATENT DOCUMENTS

| | | | | |
|---|---|---|---|---|
| 3,709,847 | A | 1/1973 | Toepfl et al. | |
| 4,101,272 | A * | 7/1978 | Guise | D06M 15/65 427/386 |
| 4,195,152 | A | 3/1980 | Floyd | |
| 4,704,446 | A * | 11/1987 | Goel | C08G 18/4081 528/28 |
| 5,977,286 | A | 11/1999 | Marten et al. | |
| 7,759,435 | B2 * | 7/2010 | Burns | C08G 18/3206 525/410 |
| 8,524,807 | B2 * | 9/2013 | Butikofer | C08G 59/184 523/401 |
| 8,784,711 | B2 * | 7/2014 | Garois | C08G 69/40 264/211.23 |
| 9,212,251 | B2 * | 12/2015 | Frick | C08G 18/10 |
| 9,217,083 | B2 * | 12/2015 | Hans | C08G 59/184 |
| 9,737,628 | B2 * | 8/2017 | Wetterer | A61L 9/01 |
| 2005/0148752 | A1 * | 7/2005 | Klassens et al. | |
| 2007/0072981 | A1 * | 3/2007 | Miller | B82Y 30/00 524/445 |
| 2007/0274942 | A1 * | 11/2007 | Morvan | A61K 8/442 424/70.19 |

(Continued)

FOREIGN PATENT DOCUMENTS

| | | | |
|---|---|---|---|
| CN | 101319041 A | * 12/2008 | C08G 59/182 |
| EP | 10013493 | * 10/2010 | |

(Continued)

OTHER PUBLICATIONS

JEFFAMINE d230 MSDS Huntsman corp. 2007.*
JEFFAMINE t403 MSDS Hunstman corp. 2007.*
WO-2009150212-A1 Google Patents Translation pdf attached (Year: 2009).*
CN-101319041-A Google Patents Translation (Year: 2007).*

*Primary Examiner* — Gregory R Delcotto
*Assistant Examiner* — Preeti Kumar
(74) *Attorney, Agent, or Firm* — Christensen, Fonder, Dardi & Busse PLLC; Elizabeth A. Gallo; Peter S. Dardi

(57) ABSTRACT

Mixtures are described which contain reaction products of one or more amines with one or more epoxides and additionally isocyanates. Applying such mixtures to textile fabrics, especially polyester fiber fabrics, reduces or prevents unpleasant sweaty odor after physical exercise. The effects are very durable to laundering.

14 Claims, No Drawings

(56) References Cited

U.S. PATENT DOCUMENTS

| | | | | |
|---|---|---|---|---|
| 2008/0207842 | A1* | 8/2008 | Barthel | C08G 18/61 525/418 |
| 2010/0216361 | A1* | 8/2010 | Bruchmann et al. | 442/59 |
| 2013/0333840 | A1* | 12/2013 | Audenaert | C08G 18/5024 156/330 |

FOREIGN PATENT DOCUMENTS

| | | | | |
|---|---|---|---|---|
| WO | WO9635458 | * | 11/1996 | |
| WO | 2008147473 | | 1/2008 | |
| WO | WO 2008079440 A2 | * | 7/2008 | C08G 59/22 |
| WO | WO-2009150212 A1 | * | 12/2009 | C08G 59/18 |

* cited by examiner

TEXTILE FABRICS WITH REDUCED BUILDUP OF ODOR

CROSS REFERENCE TO RELATED APPLICATIONS

This application is the National Phase of International Application PCT/EP2012/053394 filed Feb. 29, 2012 which designated the U.S. and which claims priority to European Pat. App. No. 11001851.2 filed Mar. 5, 2011. The noted applications are incorporated herein by reference.

It is known that textile fabrics, especially textile fabrics composed of polyester fibers, that come into contact with the human body can have an unpleasant odor. This is especially true when they were exposed to human perspiration, for example due to physical exercise or some other strenuous physical activity. This unpleasant odor is frequently not removable by washing the textile, and in fact it often becomes more intense after the textile has been repeatedly worn and subsequently washed.

A prior art attempt to resolve the issue/reduce the buildup of bothersome odor involved treating polyester articles with biocides such as antimicrobials. Examples thereof are silver or its salts or aromatic polychlorinated compounds. The disadvantage of treating with biocides is, first, the harmful impact on the environment. Secondly, adverse effects on human skin are frequently impossible to rule out. Therefore there was a demand for products which without the use of biocides are suitable for reducing or entirely eliminating the buildup of bothersome unpleasant odors on textiles.

The problem addressed by the present invention was accordingly that of providing products which are suitable for treating textile fabrics, especially textile fabrics composed of polyester materials, and the use of which makes it possible to suppress or completely eliminate bothersome odors in textiles.

The problem addressed by the present invention was further that of providing textile fabrics, especially fabrics consisting wholly or predominantly of polyester fibers/filaments and which, following contact with human skin and subsequent laundering, have at most minimal tendency to form unpleasant odor.

These problems were solved on the one hand by reaction products of aliphatic monoamines or polyamines or of a mixture of such amines with aliphatic monoepoxides or polyepoxides or with mixtures of such epoxides, wherein the mono- or polyamines are selected from a) non-ethoxylated amines of formula $$R{-}(NH{-}CH_2{-}CH_2)_n{-}NH_2$$

where R is alkyl of 6 to 24 and preferably of 12 to 18 carbon atoms and n is from 0 to 10, b) polyetheramines of formula

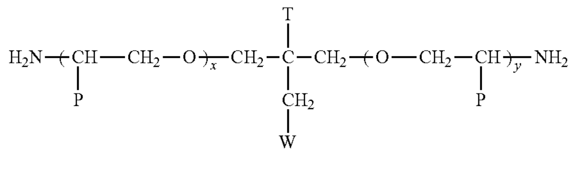

where each P is H or $CH_3$ and W is H or

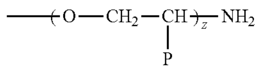

where T is alkyl of 1 to 6 carbon atoms and where x, y and z are each from 0 to 50 subject to the proviso that the sum x+y+z is from 3 to 100 and preferably 5 or 6, c) amino-functional polyorganosiloxanes derived from polydialkylsiloxanes as a result of one or more alkyl groups in the polydialkylsiloxane chain being replaced by moieties containing at least one primary amino group, preferably by moieties of formula $$-(CH_2{-}CH_2{-}CH_2{-}NH)_a{-}CH_2{-}CH_2{-}NH_2$$

where a is 0 or 1, and on the other by textile fabrics treated with a liquid composition and subsequently dried and cured, wherein the liquid composition contains a component A comprising one or more reaction products as defined in claim 1, 2 or 3 and a component B comprising at least one monoisocyanate or polyisocyanate or a mixture of such isocyanates, wherein the isocyanates can be present in free or blocked form. Optionally, the liquid composition may have a pH of less than 7, for example as a result of adding acetic acid.

The textile fabrics of the present invention are preferably wovens or knits consisting of polyester at 50 to 100 wt %, preferably 90 to 100 wt %.

Polyester-containing textile fabrics of the abovementioned type have the advantage that they, unlike known textiles, are distinctly less prone to form unpleasant odors after contact with human perspiration and subsequent washing than known textiles. They can further be produced without using biocides, which has advantages in respect of the environment and skin compatibility. It is believed that the textiles of the present invention not only have a barrier layer which prevents the penetration of sweat into the fiber material but also facilitate the removability of sweat by laundering.

There is a further advantage with the textiles of the present invention in that they confer a remarkably pleasant wearing comfort.

In place of polyester, the textile fabrics can also consist of other fibers where odoriferousness is an issue.

The textiles can also consist of blends of polyester fibers with other fibers. Preferably, however, the fibers are polyester fibers and textile fabrics consisting of 100 wt % polyethylene terephthalate must be mentioned in particular. Fibers of aliphatic or aromatic polyamides are useful as well as polyester fibers.

The textiles of the present invention preferably consist of polyester fibers at 50 to 100 wt % and especially at 90 to 100 wt %. The term "polyester fibers" here subsumes not only continuous filaments but also staple/spinnable fibers. When the textiles of the present invention do not consist of 100 wt % of polyester, the rest may consist of other fibers such as, for example, cotton fibers, elastane fibers or polyamide fibers.

The polyester fibers used preferably consist of polyethylene terephthalate (PET). However, other polyesters can also be used or, mixed with PET, co-used.

The textile fabrics of the present invention are preferably wovens or knits. They may preferably be used in the manufacture of articles which come into contact with human skin during use. Examples are sportswear and workwear.

The possible reason for the reduction in bothersome odor with the textile fabrics of the present invention is believed to reside in the surface structure/morphology of the treated fabrics. The liquid composition applied to the textile fabrics is preferably an aqueous liquor for environmental and cost reasons. However, compositions in organic solvents or solvent mixtures can optionally also be used.

Pad-mangling is preferably used to apply liquid compositions to the textile fabrics. Customary liquor concentrations known from the textile industry can be used in the pad-mangling operation. The concentration of the liquor, preferably of the aqueous liquor, in the pad-mangling operation as well as the other pad-mangling conditions are preferably adjusted such that, after curing, there is an add-on of 0.5 to 3 wt % on the fabric, based on water-free and solvent-free product.

After pad-mangling, the textiles are dried and cured.

Drying is preferably done at a temperature in the range from 100 to 120° C. Curing, among other things, serves to anchor the products on the fiber and is preferably carried out at a temperature in the range from 140 to 180° C. in the case of polyester fabrics.

It is believed that, in the course of the curing of the textiles, the reaction products of the present invention (component A), the isocyanates (component B) and the textile material combine to form materials responsible for the good odor control properties of the textile.

To produce textile fabrics which are in accordance with the present invention, fabrics composed of fiber materials are treated with a liquid composition, dried and cured.

The liquid composition contains a component A comprising at least one reaction product of the present invention, formed from aliphatic amine and aliphatic epoxide, and a component B comprising at least one monoisocyanate or polyisocyanate. However, the liquid composition may also contain two or more products coming within the below-recited definition of component A and/or two or more products coming within the definition of component B.

Component A contains at least one reaction product of aliphatic monoamine or polyamine or of mixtures of such amines with aliphatic monoepoxide or polyepoxide or with mixtures of such epoxides.

Component B contains at least one monoisocyanate or polyisocyanate or a mixture of such isocyanates. The corresponding isocyanates may be present in free form or in completely or partially blocked form. In the latter case, known blocking agents may be used, preferably ketone oximes such as butanone oxime. The blocking is reversible at elevated temperature, for example at the curing temperature.

The amines reacted with epoxides to obtain component A are aliphatic mono- or polyamines or mixtures of such amines. The epoxides here are likewise aliphatic compounds, namely aliphatic mono- or polyepoxides. "Polyamines" or "polyepoxides" herein are products containing two or more amino groups and epoxy groups, respectively, in the molecule. Amines containing aromatic groups and epoxides containing aromatic groups are less suitable or completely unsuitable.

Reaction products of the present invention (component A) are prepared using mono- or polyamines containing at least one primary amino group. Secondary amino groups can additionally also be present as well.

The amines are preferably reacted with mono- or polyepoxides under such conditions that the product formed still contains free amino groups. The reaction can be carried out with or without a solvent, preferably at a temperature in the range from 70° C. to 130° C. and in such amounts that the product resulting after the reaction still contains free amino groups.

Useful amines are particularly suitably a) comparatively long-chain primary or secondary aliphatic mono- or polyamines, of formula $$R{-}(NH{-}CH_2{-}CH_2)_n{-}NH_2$$

such as stearylamine for example. Also very suitable for use are b) polyetheramines such as the products of the JEFFAMINE range from Huntsman Corp. Products of the JEFFAMINE range conform to the abovementioned structural formula b). They are obtainable by reacting amines such as hydrogenated tallowamines for example with ethylene oxide and/or propylene oxide. One representative example is JEFFAMINE T 403, which is described in technical bulletins available from Huntsman Corp.

Useful amines or polyamines for the reaction with mono- or polyepoxides further include c) amino-functional polyorganosiloxanes. That is, polydialkylsiloxanes, especially polydimethylsiloxanes, where some alkyl groups are replaced by aliphatic moieties containing one or two amino groups. These aliphatic moieties are preferably moieties of formula $$-CH_2-CH_2-CH_2-NH-CH_2-CH_2-NH_2$$

or of formula $$-CH_2-CH_2-CH_2-NH_2$$

Products particularly suitable for use as component A and hence preferred for use as component A are formed by reaction of two or more amines with monoepoxide or polyepoxide, wherein the reaction utilizes not only amines of the formula recited under a) but also amines of the formula recited under b) and optionally also amines of the formula recited under c), while the individual types of amines can be used in the reaction as a mixture or individually in succession.

The epoxides used for preparing component A are aliphatic mono- or polyepoxides, especially with 1 or 2 epoxy groups. Products containing ether groups as well as epoxy functions are highly suitable. One example is the ARALDIT DY-H product from Huntsman Corp. The reaction preferably utilizes diepoxides of formula

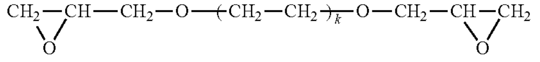

where k is from 1 to 4. In place of these diepoxides, it is also possible to use diepoxides of this formula where in each of which a hydrogen atom of the epoxy group is replaced by a methyl group.

The liquid composition used for treating the textile fabrics, in addition to component A as described above, further contains at least one component B. This component B is a monoisocyanate or a polyisocyanate, i.e., a product having one or more isocyanate groups. Component B can also be a mixture of such isocyanates. In contradistinction to component A, which does not contain any aromatic groups, component B may also contain aromatic moieties. Aliphatic or aromatic diisocyanates or mixtures of diisocyanates are particularly useful as component B. Examples thereof are unsubstituted or alkyl-substituted 1,6-hexamethylene diisocyanate, 4,4'-diphenylmethane diisocyanate, 4,4'-dicyclohexylmethylene diisocyanate or tolylene diisocyanate. Also very useful as component B are polyisocyanates containing prepolymers or precondensates of the abovementioned isocyanate compounds, which are formed by reaction with mono- or polyhydric alcohols and which still contain free isocyanate groups. These prepolymers or precondensates thus contain urethane bonds as well as free isocyanate groups.

Using component B enhances the durability of the odor control finish on the textile fabrics of the present invention, as becomes especially noticeable after these articles have been repeatedly worn and washed.

There is a further advantage with the textile fabrics of the present invention, which are preferably wovens or knits, in that it is possible to admix scent chemicals, e.g., perfumes, to the wash liquor during the laundering operation to obtain pleasant-smelling articles. This said laundering operation generally comprises two steps:

In the first step (the cleaning step), soiling and malodorophores are removed from the textile. In the second step (the rinsing/conditioning step), the textile is treated with a commercially available rinse-cycle fabric conditioner. On adding scent chemicals or perfumes, for example limonene, citronella, acetate ester, pinenes, etc., to this rinse-cycle fabric conditioner, the textiles are surprisingly found to have a pleasant fresh scent after this laundering operation. This scent is substantially more pronounced than in the case of polyester fabric that has not been treated in accordance with the present invention.

Furthermore, tests involving real people have shown that polyester material treated according to the invention is a textile which, after sweating and subsequent cooling, has a wool-like character in place of the typical polyester feel. These findings were confirmed by corresponding measurements. These measurements show that, after a test person has sweated, polyester fabrics treated according to the invention cool down less and therefore confer a more pleasant feel which comes close to the wearing comfort of wool.

The textile fabrics of the present invention are preferably wovens or knits, especially textiles consisting wholly or predominantly of polyester. They are very useful in the manufacture of articles which come into contact with human skin during use. Said articles can be sportswear or work clothing. When textile fabrics of the present invention are used, this provides the positive effect of unpleasant sweaty odor being reduced after laundering.

The invention will now be illustrated using exemplary embodiments.

EXAMPLE 1 (IN ACCORDANCE WITH THE INVENTION)

Preparation of Amine/Epoxide Reaction Products

Several reaction products of amines with epoxides were prepared. Formulations 1a) to 1d) described hereinbelow were obtained.

Example 1a)

77 g of stearylamine, 10 g of an amino-functional polydimethylsiloxane and 11 g of a polyetheramine were mixed and the mixture was heated to from 100° C. to 110° C. At this temperature, 95 g of a diepoxide were added dropwise. After cooling to 60° C., 24 g of acetic acid, 20 g of dispersants and 710 g of water were added.

The polyetheramine used was JEFFAMINE T-403, while the diepoxide was an aliphatic diepoxide (ARALDIT DY-H) having a diglycidyl ether group at both ends of an alkylene chain. A mixture of ethoxylated products was used as dispersants.

The product obtained is hereinafter referred to as "formulation 1a".

Example 1b)

Example 1a was repeated except that the mixture before the dropwise addition of the diepoxide was only heated to about 70° C. and 680 g of water were added at the end of the synthesis and not 710 g.

The product obtained is hereinafter referred to as "formulation 1b".

Example 1c)

76 g of stearylamine, 94 g of the same diepoxide as in Example 1a), 10 g of an amino-functional polydimethylsiloxane and 21 g of a polyetheramine (JEFFAMINE D-400) were mixed together at room temperature. The mixture was then heated to about 100° C. and was subsequently mixed with 20 g of dispersant (mixture of ethoxylated products), 29 g of acetic acid and then, at 80° C., with 250 g of water. On cooling to room temperature, a light beige, slightly cloudy liquid was obtained and it was subsequently diluted to 20 wt % active content to reduce the viscosity. The product obtained is hereinbelow referred to as "formulation 1c".

Two different amino-functional polydimethylsiloxanes (PDMSs) were used in examples 1a) to 1c). The PDMS used in Examples 1a) and 1b) was a polymer having a linear polydimethylsiloxane chain with a trimethylsilyl group at each end. Some methyl groups were replaced by amino-containing side chains of formula $$—CH_2—CH_2—CH_2—NH—CH_2—CH_2—NH_2$$

The nitrogen content of this silicone was about 3 wt %.

The PDMS used in Example 1c) likewise contained a linear PDMS chain with $—Si(CH_3)_3$ end groups and the same side chains as described in the case of 1a) and 1b). The nitrogen content of the Example 1c) PDMS was 7.1 wt %.

Example 1d)

In contradistinction to Examples 1a) to 1c), no amino-functional silicone was used in 1d). 155 g of stearylamine, 44 g of JEFFAMINE T-403 and 191 g of diepoxide (ARALDIT DY-H) were mixed together and the mixture was first heated to about 70° C. and then to from 100 to 107° C. After cooling to room temperature and renewed staged heating to 50-70° C., 39 g of dispersant (mixture of ethoxylated products) and 490 g of water were added.

The product mixture obtained is hereinbelow referred to as "formulation 1d".

EXAMPLE 2: DETERMINING THE ROI VALUES OF POLYESTER FABRIC SPECIMENS

Formulations 1a to 1d were used to prepare the corresponding "recipes" 2a to 2k by adding a product, or product mixture, having isocyanate groups.

The product mixture containing isocyanate groups was a prepolymer having polyurethane groups and isocyanate groups partly blocked by reaction with butanone oxime. The prepolymer was constructed by reacting diphenylmethane diisocyanate, 1,1,1-trimethylolpropane, propylene glycol and N-methyldiethanolamine and was a product which also contained water, ethoxylated alcohol and small amounts of hydrochloric acid. This prepolymer is hereinbelow referred to as "PP". The recipes which follow were prepared by mixing the ingredients mentioned hereinbelow: TDI is a prepolymer similar to PP, but with tolylene diisocyanate instead of diphenylmethane diisocyanate, and CDI is a prepolymer similar to PP but with dicyclohexylmethylene diisocyanate.

| | |
|---|---|
| Recipe 2a: | formulation 1d + 10 g/l PP |
| Recipe 2b: | formulation 1d + 15 g/l TDI |
| Recipe 2c: | formulation 1d + 15 g/l CDI |
| Recipe 2d: | formulation 1c + 10 g/l PP + 5 g/l CDI |
| Recipe 2e: | formulation 1c + 15 g/l TDI |
| Recipe 2f: | formulation 1c + 25 g/l PP |
| Recipe 2g: | formulation 1b + 15 g/l CDI |
| Recipe 2h: | formulation 1b + 10 g/l PP |
| Recipe 2i: | formulation 1a + 15 g/l CDI |
| Recipe 2j: | formulation 1a + 15 g/l TDI |
| Recipe 2k: | formulation 1a + 10 g/l PP |

Recipes 2a to 2k were used as aqueous liquors for pad-mangle treatment of blue-dyed polyester fabric specimens. Subsequent to recipe application, the individual fabric specimens were dried at 100-105° C. and cured for 5 minutes at about 150° C. The tests were carried out using different fabric add-on levels for the individual recipes. After curing, the specimens were subjected to a test for determining the ROI value. The ROI (relative odor index) value indicates the levels on the fabric of the "sweat acid" identified hereinbelow, compared with blue PES fabrics not treated with the recipes. 3-Methyl-2-hexenoic acid is the "sweat acid" used in the tests because it occurs in human sweat.

The following method was used to determine the ROI value:

The fabric specimen is placed in a sealable vessel. The sweat acid is dripped onto a glass fiber filter which is in the vessel but not in direct contact with the fabric, so that the sweat acid is only in the vapor space above the specimen. The vessel is then sealed and conditioned at 37° C. for 20 hours, so that the fabric can take up the sweat acid from the vapor space. The fabric specimen is subsequently washed with a commercially available laundry detergent and extracted with a mixture of pyridine and BSTFA (N,O-bis (trimethylsilyl)trifluoroacetamide). The amount of sweat acid is then determined using gas chromatography/mass spectrometry. The value found is related to that found in the case of an unfinished specimen of polyester to obtain the ROI value which is defined as the ratio of extracted sweat acid quantity on finished PES to extracted sweat acid quantity on non-finished PES. Thus, a smaller ROI value means that there was less sweat acid on the investigated specimen than in the case of a larger ROI value. The ROI value was determined on the individual fabric specimens after finishing and after several washes in each case. The washes were carried out at 40° C. using a commercially available domestic laundry detergent.

Results:

| Recipe/ (add-on in wt %) | ROI value of unwashed fabric | ROI value after 20 washes |
|---|---|---|
| — (Comparator: non-finished PES) | 1 | 1 |
| 2a/(1.5) | 0.14 | 0.21 |
| 2b/(1.8) | 0.16 | 0.32 |
| 2c/(1.8) | 0.24 | 0.51 |
| 2d/(1.9) | 0.21 | 0.40 |
| 2e/(1.9) | 0.16 | 0.43 |
| 2f/(2.6) | 0.19 | — (not determined) |
| 2g/(1.7) | — (not determined) | 0.25 |
| 2h/(1.8) | 0.22 | 0.29 |
| 2i/(1.8) | 0.27 | 0.47 |
| 2j/(1.8) | 0.26 | 0.49 |
| 2k/(1.6) | 0.32 | 0.51 |

It is distinctly apparent that distinctly less sweat acid can be extracted from the finished fabric specimens than from non-finished polyester fabric (comparative material). The washed fabric specimens likewise contain distinctly less sweat acid (lower ROI value) than the non-finished fabric.

EXAMPLE 3 (WEAR TESTS)

Three T-shirts of blue-dyed polyester fabric were tested by wearing them. The fabrics had been finished with the following recipes using aqueous liquors:

Test 3a (in accordance with the invention): 30 g/l of recipe 2a

Comparator 3b: non-finished fabric

Test 3c (in accordance with the invention): 60 g/l of formulation 1c+10 g/l PP

Comparator 3d: non-finished fabric

Test 3e: (in accordance with the invention): 60 g/l of formulation 1b+10 g/l PP

Comparator 3f: non-finished fabric

The T-shirts were washed and then finished with the recipes of tests 3a, 3c and 3e, dried and cured. The non-finished comparative material was sewn together with the fabric specimens of tests 3a, 3c and 3e, respectively, to form T-shirts. These T-shirts were worn by different test persons directly on the skin during a bout of physical exercise (playing tennis). After intensive sweating, the two constituent-part fabrics of the T-shirts were separated again in each case and each of the two constituent parts was stored separately in a sealed vessel at 37° C. and at room temperature respectively for 2 days. Thereafter, the bottles were briefly opened and the odor assessed by various test persons. The specimens were subsequently washed and put back into the vessels, which were sealed and stored at 40° C. for 1 day. The wash was done with customary domestic laundry detergent. After opening the vessels, various test persons performed a second odor assessment.

Results (Odor Assessment)

TABLE 1

(Tests 3a and 3b)

| Test person No. | Test 3a (no wash) | Comparator 3b (no wash) | Test 3a (after wash) | Comparator 3b (after wash) |
|---|---|---|---|---|
| 1 | sweaty odor but less than 3b | pronounced sweaty odor | no sweaty odor | sweaty odor |
| 2 | sweaty odor but less than 3b | pronounced sweaty odor | no sweaty odor | sweaty odor |
| 3 | sweaty odor but less than 3b | pronounced sweaty odor | no sweaty odor | sweaty odor |
| 4 | sweaty odor but less than 3b | pronounced sweaty odor | minimal sweaty odor | pronounced sweaty odor |
| 5 | sweaty odor but less than 3b | pronounced sweaty odor | sweaty odor | sweaty odor |
| 6 | sweaty odor but less than 3b | sweaty odor | sweaty odor | sweaty odor |

TABLE 2

(Tests 3c and 3d)

| Test person No. | Test 3c (no wash) | Comparator 3d (no wash) | Test 3c (after wash) | Comparator 3d (after wash) |
|---|---|---|---|---|
| 1 | no sweaty odor | pronounced sweaty odor | no sweaty odor | minimal sweaty odor |
| 2 | very minimal sweaty odor | sweaty odor | no sweaty odor | minimal sweaty odor |
| 3 | slight sweaty odor | sweaty odor | no sweaty odor | no sweaty odor |
| 4 | slight sweaty odor | pronounced sweaty odor | no sweaty odor | minimal sweaty odor |
| 5 | no sweaty odor | sweaty odor | no sweaty odor | minimal sweaty odor |
| 6 | no sweaty odor | sweaty odor | no sweaty odor | no sweaty odor |

TABLE 3

(Test 3e, 3f)

| Test person No. | Test 3e (no wash) | Comparator 3f (no wash) | Test 3e (after wash) | Comparator 3f (after wash) |
|---|---|---|---|---|
| 1 | very slight sweaty odor | distinct sweaty odor | no sweaty odor, sour smell | sweaty odor |
| 2 | very slight sweaty odor | distinct sweaty odor | no sweaty odor, sour smell | sweaty odor |
| 3 | very slight sweaty odor | pronounced sweaty odor | no sweaty odor, sour smell | sweaty odor |
| 4 | very slight sweaty odor | distinct sweaty odor | no sweaty odor, sour smell | sweaty odor |
| 5 | very slight sweaty odor | distinct sweaty odor | no sweaty odor, sour smell | fatty |

Thus, all the test persons judged all the finished T-shirts to be better in terms of sweaty odor than the non-finished comparative fabrics.

The invention claimed is:

1. A textile fabric treated with a liquid composition and subsequently dried and cured, wherein the liquid composition contains a component A comprising one or more reaction products formed from the reaction of a mixture of a polyepoxide and amines a), b) and c) wherein a) is a non-ethoxylated amine of formula $$R-(NH-CH_2-CH_2)_n-NH_2$$

where R is an alkyl of 6 to 24 and n is from 0 to 10, b) is a polyetheramine of formula

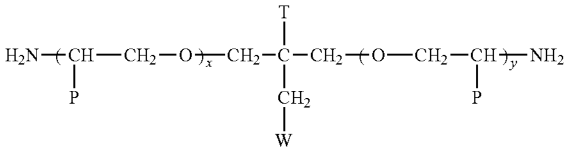

where each P is H or $CH_3$ and W is H or

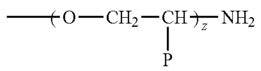

where T is an alkyl of 1 to 6 carbon atoms where x, y and z are each from 0 to 50 subject to the proviso that the sum x+y+z is from 3 to 100, and c) is an amino-functional polyorganosiloxane derived from polydialkylsiloxanes as a result of one or more alkyl groups in the polydialkylsiloxane chain being replaced by moieties of formula $$-CH_2-CH_2-CH_2-NH-CH_2-CH_2-NH_2$$

or of formula $$-CH_2-CH_2-CH_2-NH_2$$

wherein the amines a), b) and c) can be used in the reaction as a mixture or individually in succession, and wherein component A comprises a primary amino group and is a liquid; and a component B comprising at least one monoisocyanate or polyisocyanate or a mixture of such isocyanates, wherein the polyisocyanate comprises isocyanates can be present in free or blocked form; and wherein the liquid composition is an aqueous composition having a pH less than 7, and wherein the textile fabric comprises an add-on of 0.5 to 3 wt % on the textile fabric, based on water-free and solvent-free product, and is dried at a temperature in the range from 100 to 120° C. and/or cured at a temperature in the range from 140 to 180° C.

2. The textile fabric as claimed in claim 1, wherein the textile fabric is a woven or knitted fabric consisting essentially of polyester at 50 to 100 wt %, based on the total weight of the textile fabric.

3. The textile fabric as claimed in claim 1, consisting of 100 wt % polyethylene terephthalate fibers.

4. The textile fabric as claimed in claim 1, wherein said component B is an aliphatic or aromatic diisocyanate or a mixture of such diisocyanates.

5. The treated textile fabric of claim 1 wherein a relative odor index of the treated textile fabric is greater than that of the textile fabric.

6. The treated textile fabric of claim 1 wherein the liquid composition comprises acetic acid.

7. A liquid composition comprising:

component A comprising one or more reaction products formed from the reaction of a mixture of a polyepoxide and amines a), b) and c) wherein a) is a non-ethoxylated amine of formula $$R-(NH-CH_2-CH_2)_n-NH_2$$

where R is an alkyl of 6 to 24 and n is from 0 to 10, b) is a polyetheramine of formula

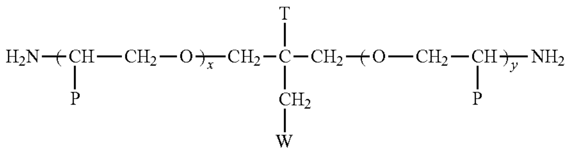

where each P is H or $CH_3$ and W is H or

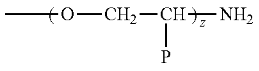

where T is an alkyl of 1 to 6 carbon atoms where x, y and z are each from 0 to 50 subject to the proviso that the sum x+y+z is from 3 to 100, and c) is an amino-functional polyorganosiloxane derived from polydialkylsiloxanes as a result of one or more alkyl groups in the polydialkylsiloxane chain being replaced by moieties of formula $$-CH_2-CH_2-CH_2-NH-CH_2-CH_2-NH_2$$

or of formula $$-CH_2-CH_2-CH_2-NH_2$$

wherein the amines a), b) and c) can be used in the reaction as a mixture or individually in succession, and wherein component A comprises a primary amino group and is a liquid, and component B comprising at least one monoisocyanate or polyisocyanate or a mixture of such isocyanates, wherein the polyisocyanate comprises isocyanates present in free or blocked form and wherein the liquid composition is an aqueous composition having a pH less than 7.

8. The liquid composition of claim 7 wherein component B comprises a polyisocyanate comprising a free isocyanate group, wherein the polyisocyanate comprises a prepolymer formed by reaction of an unsubstituted or alkyl-substitututed 1,6-hexamethylene diisocyanate, 4,4'-diphenylmethane diisocyanate, 4,4'-dicyclohexylmethylene diisocyanate or tolylene diisocyanate with mono- or polyhydric alcohols.

9. The liquid composition of claim 8 wherein the mono- or polyhydric alcohols comprise 1,1,1-trimethylolpropane, propylene glycol and N-methyldiethanolamine.

10. The textile fabric of claim 1 wherein component B comprises a polyisocyanate comprising a free isocyanate group, wherein the polyisocyanate comprises a prepolymer formed by reaction of an unsubstituted or alkyl-substitututed 1,6-hexamethylene diisocyanate, 4,4'-diphenylmethane diisocyanate, 4,4'-dicyclohexylmethylene diisocyanate or tolylene diisocyanate with mono- or polyhydric alcohols.

11. The textile fabric of claim 10 wherein the mono- or polyhydric alcohols comprise 1,1,1-trimethylolpropane, propylene glycol and N-methyldiethanolamine.

12. The textile fabric of claim 1 wherein the textile fabric comprises polyester fibers and other fibers selected from cotton fibers, elastane fibers or polyamide fibers.

13. The liquid composition of claim 7 wherein P is $CH_3$ and the sum x+y+z is from 5 to 6.

14. The textile fabric of claim 1 wherein P is $CH_3$ and the sum x+y+z is from 5 to 6.

* * * * *